Figure 1:
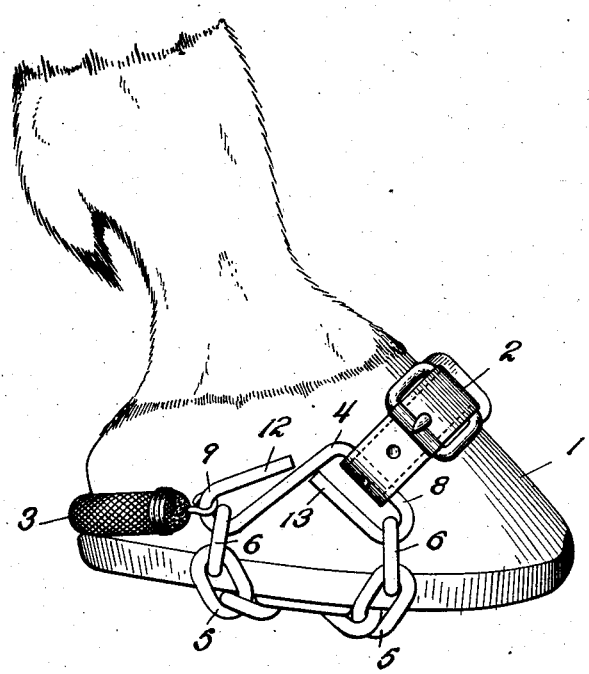

G. N. KINNELL.
EMERGENCY OVERSHOE AND LINK THEREFOR.
APPLICATION FILED AUG. 2, 1910.

1,010,385.

Patented Nov. 28, 1911.

WITNESSES:

INVENTOR
George N. Kinnell
BY
ATTORNEYS

UNITED STATES PATENT OFFICE.

GEORGE N. KINNELL, OF PITTSFIELD, MASSACHUSETTS.

EMERGENCY-OVERSHOE AND LINK THEREFOR.

1,010,385.  Specification of Letters Patent.  Patented Nov. 28, 1911.

Application filed August 2, 1910. Serial No. 575,172.

*To all whom it may concern:*

Be it known that I, GEORGE N. KINNELL, a citizen of the United States, and resident of Pittsfield, in the county of Berkshire and State of Massachusetts, have invented certain new and useful Improvements in Emergency-Overshoes and Links Therefor, of which the following is a specification.

My present invention relates to overshoes for horses particularly such as are adapted for ready application and removal from the hoof over the usual horse's shoe. In such overshoes the tread portion whether constructed for the sole purpose to prevent slipping or for other purposes is likely to become damaged or worn in course of time by reason of the severe pounding and strains to which it is subjected when in use on the horse's hoof.

My present invention relates to means for renewal of the tread portion of such an overshoe and consists in an arrangement of parts whereby a tread and a securing means therefor may be adapted so that renewals of either treads or securing means may be readily effected. My invention for this purpose is shown herein as applied to the particular form of non-slip emergency overshoe shown in my prior application Serial No. 460,336, filed Oct. 30, 1908. In said prior application the overshoe comprises a heel member extending around the rear of the hoof and engaging the notches between the projecting ends of the horse's shoe and the heels of the hoof, a strap extending diagonally over the toe, and intermediate side links having the function of spreaders for a tread which consists of diagonally arranged lengths of chains spanning the hoof cavity and there connected to a common central link.

In the above application the side links or spreaders are shown as integral pieces of metal, that is, containing no splits with which the end links of the tread are interlinked, so as not to be capable of ready assembly therewith or removal therefrom. In another application, Ser. No. 481,830, I have made these end links of the tread, which engage the side links, of the usual construction commonly given to the so-called split links and this expedient is useful. I find in practice that such end links may occasionally work down under the edge of the horse's shoe, and being of flexible or malleable material may be broken or at least bent and misshapen, in which case they may become disengaged and may damage the hoof. According to my present invention I prefer to make these end links of the tread of case hardened metal like the rest of the tread, and to make the side links or spreader of malleable metal having somewhat the characteristic qualities of the material of which split links are made. This is quite practicable because I have discovered that in practice the side links cannot work down to a position where they receive strains or wear requiring case hardened metal to resist damage.

The form and arrangement of this link will be more fully understood by reference to the accompanying drawings in which—

Figure 2:
Figure 3:
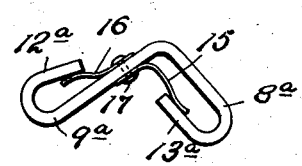

Figure 1 is a side view of a horse's hoof showing my invention applied thereto. Fig. 2 is a top plan view of the link. Fig. 3 is a side view of a modified form of link.

In said Fig. 1, the overshoe applied to the horse's hoof 1, comprises a toe strap 2. heel member 3, side links or spreaders 4 on the side of the hoof and tread chains 5—5 secured to the spreaders by the end links 6—6. The said link or spreader consists essentially of two rigidly connected portions extending in angular relation, one member extending transversely of and being engaged laterally by the toe strap while the other member extends in approximate alinement with the heel strap. The tread is of any usual desired construction and the chains 5 comprising the same are preferably of case hardened metal of quality best adapted to withstand concussion and strains as well as wear. The end links 6—6 may be of the same quality as the other links of the tread.

As shown in the drawing the side link or spreader 4 has practically the same relation and practically the same functions as has the spreader shown in my prior application referred to but the forward loop 8 for engaging the toe strap and the forward tread chain and the rear loop 9 for engaging the heel member and the rear tread chain are formed by bending a flexible length of rod, a wire of suitable quality and thickness. The quality and thickness of the metal selected will usually be such as to prevent any possibility of deformation under the conditions of use and yet will be sufficiently flexible to permit of bending without rupture to the shape shown. In order that it may retain the configuration given it by bending it should be flexible or malleable rather than springy. The thickness, proportions, and shape of the spreader may be substantially the same as shown in Fig. 2 wherein the sharp vertical bend is shown at 10 and concave or lateral curve at 11. The purpose of the latter curve is to conform the shape of the spreader to the curvature of the hoof. The loop 8 is also preferably twisted slightly out of the plane of the loop 9 to the extent shown in the drawings, as this improves the balance of the device when under strain in actual use. The rear loop 9 is preferably elongated so that the reversely extending portion 12 is almost as long as the upturned portion 13. It is obviously not necessary that the dimensions be so nearly the same, since the proportions shown in my prior application, may be employed if desired, but there is special advantage in lengthening out the reverse portion 12 because it facilitates the manipulation hereinafter described for the purpose of removing and applying the tread when removals are necessary. This operation is preferably performed with the aid of simple tools such as an ordinary bench vise adapted to grasp the body and one loop of the spreader while the other loop is being bent open for removing and applying an end link of a tread chain, the loop being easily bent or hammered open and then back to the closed position. The spreader may be then reversed and the other loop similarly opened and closed. Practical experience in the performance of this operation shows at once the desirability of having the curvature of the two loops of the spreaders approximately the same and the length of the reversely bent portions 12, 13, approximately the same. By making the curvature of the bends the same, the amount of work to be done in opening or closing the loops will be substantially the same and by making the reversely bent portion of the same length the leverage becomes substantially the same. Thus the operation of opening and closing either loop being substantially the same, the thickness and stiffness of the metal can be increased up to the limit permitted by the leverage available for the forward or strap loop with the certainty that bending the rear or heel loop will require about the same effort as bending the strap loop. In other words, the proper length for the strap loop, and therefore for the reversely bent portion 13, is fixed by the requirements established by the width of the strap 2 and the play of the link 6; and I now propose to standardize the two loops, so that the maximum stiffness of wire that will permit satisfactory opening of the loop 8 will call for no greater leverage in opening the loop 9.

In Fig. 3 I have shown another form of side link adapted to permit insertion and removal of the end links 6 of the tread without requiring these links to be split. In this form of the invention the reversely bent portions 12$^a$ and 13$^a$ of the loops 9$^a$ and 8$^a$ also have free ends which permit the passage of the tread connections; but here the reversely bent portions are shortened so that their ends do not lie in contiguity to the body or common portion of the link. Instead, they coöperate with the free end portions of spring tongues 15 and 16, the other ends of which are fixed to the link. They may be, and preferably are, arranged as shown, so that they may be held by a single rivet 17. These spring tongues lie inside the reversely bent portions 12$^a$ and 13$^a$, and permit ready insertion of the links 6 but bar these links against accidental egress from the loops. In this construction it is not necessary to bend the portions 12$^a$ and 13$^a$ to permit the passage of the tread connections.

While I have herein fully shown and described, and have pointed out in the appended claims certain novel features of construction, arrangement, and operation which characterize my invention, it will be understood by those skilled in the art that various omissions, substitutions and changes in the forms, proportions, sizes and details of the device and of its operation, may be made without departing from my invention.

I claim:

1. As a new article of manufacture a side link or spreader for overshoes comprising toe and heel engaging supports and a flexible tread portion, said link or spreader being formed of a length of stout wire or rod of sufficient flexibility to permit spreading of the loops of the link, said link consisting of elongated forward and rear loops extending in angular relation to each other, the forward loop being adapted to extend transversely of and having its front side portion engaged by the toe engaging support, and the rear loop being out of the plane of the forward loop and adapted to be approximately in alinement with and engaged by the heel-engaging support, the rear side portion of the front loop and the upper side portion of the rear loop being both elongated and having free ends disposed adjacent each other and at opposite sides of and in contiguity with the common or body portion of the link.

2. As a new article of manufacture a side link or spreader for overshoes comprising toe and heel engaging supports and a flexible tread portion, said link or spreader consisting of rigidly connected members extending in angular relation to each other, the forward member being adapted to extend transversely of and be engaged laterally by the toe engaging support, and the rear member being adapted to extend in approximate alinement with the heel engaging support, said members being elongated loops having reversely bent side portions with free ends adapted to be bent into and out of contiguity with adjacent surfaces of the link to permit removal and replacement of the tread, said loops being slightly twisted relatively to each other and the link as a whole presenting a concave curve at its inner side conforming to the curvature of the hoof.

Signed at New York city in the county of New York and State of New York this 28th day of July A. D. 1910.

GEORGE N. KINNELL.

Witnesses:
GEORGE C. DEAN,
IRVING M. OBRIEGHT.

Copies of this patent may be obtained for five cents each, by addressing the "Commissioner of Patents, Washington, D. C."